United States Patent Office 3,065,208
Patented Nov. 20, 1962

3,065,208
PROCESS FOR PRODUCING EPSILON-CAPROLACTAM POLYMER WITH HEAT AND WEATHERING STABILITY
Patrick V. Papero, Jr., Hopewell, Va., and Bertram M. Helfaer, Morris Plains, N.J., assignors to Allied Chemical Corporation, New York, N.Y., a corporation of New York
No Drawing. Filed Nov. 10, 1958, Ser. No. 772,686
1 Claim. (Cl. 260—78)

This invention relates to a process for producing epsilon-caprolactam polymer characterized by its good heat and weathering stability.

High molecular weight polyamides have found wide use in molding and filament applications but in some of these applications they have lacked heat and weathering stability of desired high level. Numerous proposals have been made for improving these properties. Some of these proposals require special treatment of the finished products and/or use of considerable amounts of treating material, or have other disadvantages.

We have now discovered a process which produces stabilized high molecular weight polyamides from epsilon-caprolactam by use of very small amounts of added substance and without the necessity of introducing a separate treating step. Our process comprises adding to an epsilon-caprolactam polymerization reaction mixture, initially or during the polymerization thereof, the specific compound para-tolyl-isocyanate in small amounts such as suitably about 0.1–1 part by weight per 100 parts by weight of the polymerization reaction mixture. Thereby a remarkable improvement is obtained in the heat and weathering stability of the resulting polycaprolactam.

The following examples will serve to illustrate our process and to describe completely specific embodiments of the best mode contemplated by us for carrying out our invention, but our invention is not to be construed as limited to every detail of the examples.

EXAMPLE I

| Charge | Mols Used | Percent By Wgt. | Mol. Wgt. |
|---|---|---|---|
| 800 gms. E-Caprolactam Monomer | 7.07 | 100 | 113.2 |
| 80 gms. Distilled Water | 4.45 | 10 | 18.0 |
| 4 gms. p-Tolyl Isocyanate | 0.0305 | 0.5 | 133.1 |

The above reactants were placed in a 1500 ml. glass Erlenmeyer flask and heated to 50–60° C. until solution occurred; the solution was then charged to a 1500 ml. glass resin reaction flask. The resin reactor was equipped with a stainless steel type 316 anchor type agitator and stuffing box, a glass steam condenser, a thermocouple and stainless steel type 316 thermowell, inert gas supply (N₂) and an electric heating mantle.

After charging, the reaction vessel was purged free of air with bone-dry nitrogen containing less than 5 p.p.m. oxygen; a back pressure of one inch of water was then maintained on the vessel throughout the run.

The reactants were then heated using the following cycle:

| | |
|---|---|
| 7 hours | 90–210° C. |
| 1 hour | 210° C. (reflux). |
| 5½ hours | 210–255° C. |
| 12 hours | 255° C. (on temperature). |

During the heat-up period (90–210° C.), the resin kettle was maintained at zero reflux; steam was used in the condenser and all distillate was collected in a receiver. When the temperature reached 210° C. (approximate boiling point of 99% lactam and 1% water) the resin kettle was put on total reflux; cold water was now used in the condenser instead of steam; the reaction was maintained at this temperature for one hour. This period is called the "reflux period."

At the finish of the reflux period, the cold water supply to the condenser was shut off and low pressure steam again introduced. The kettle was now maintained at zero reflux until the completion of the run.

The reflux period, although used in this example, is not necessary when using p-tolyl isocyanate in the polymerization reaction mixture. A shorter time than the 7 hours used in this example for heating to about 200° C. can be used if the vessel is kept closed to build steam pressure, or if epsilon-aminocaproic acid is initially added in catalytic quantities.

The mixture was now heated up to 255° C. in 5½ hours during which time the remaining water was continually removed. The distillate contained approximately 2–3% lactam. The reaction mass began to thicken at 230–235° C.

The temperature rose to 255° C. and was maintained for 12 hours. During this period the polymeric chains continued to grow and reached an equilibrium state.

At the end of the "on temperature" period the agitator was stopped and pulled up out of the melt so that it might drain; caution was exercised so that no air was introduced. The electric heating mantle jacket was turned off and removed from around the vessel so that the molten polymer might solidify.

After the polymer was solidified and cooled to below 50–60° C., the inert gas (N₂) was shut off and the apparatus dismantled. The polymer was removed as a bar 4 inches in diameter and approximately 6 inches long. The bar was cut into small pieces and ground to 20 mesh in a Wiley mill.

*Washing and drying.*—The ground polymer was washed in a suitable agitated apparatus with distilled water at a ratio of 1:1.2 polymer to water at 100° C. for a 2 hour period.

The water was removed and fresh previously boiled distilled water (free from air) was again added in the above ratio. A total of 5 washings were made and the polymer was then removed and placed into stainless steel trays for drying. In the above operation an inert gas blanket was always used when the polymer was exposed without water.

The washed polymer was dried in a vacuum oven (30 inches) at 85° C. for 48 hours until the moisture content was less than 0.3% by analysis.

The resulting polymer had excellent white color, showing light transmissivity of at least about 90% in dilute solution in 90% formic acid. By contrast a polymer prepared similarly in presence of the amine, paratoluidine, was off-white to cream colored.

*Spinning.*—The above polymer was spun on a laboratory press spinner having a small spinnerette containing 10 holes each 0.012 inch in diameter. The yarn collected was drawn at approximately 4:1 ratio. The total denier of the yarn was approximately 60–70 denier of 6–7 denier per filament.

*Evaluation for heat and weathering stability.*—The yarn obtained on spinning was rewound on sample bobbins which have 2 x 2 inch dimensions. The samples were exposed to the following accelerated weathering tests:

(a) Thermal exposure: Samples were placed in a forced draft oven at 165° C. for 36 hours on a revolving wheel (20 r.p.m.). Percent loss from original strength was determined.

(b) Weatherometer exposure: Samples were placed in an Atlas weatherometer for 92 hours' exposure to carbon arc radiation. A distilled water spray was given samples 10 minutes each hour. The temperature of the unit was 140°–160° F. Light wave length—1000 A.

(c) Outdoor exposure (total atmosphere): Samples were rewound on bobbins 2 x 6 inches in dimension and placed on an outdoor rack inclined at 45° facing due south. Samples were tested each 30 days until they had lost greater than 50% of their original strength. Control samples were exposed simultaneously.

The results obtained are tabulated under "A" following the examples.

EXAMPLE II

A reactor 60 gallons in size equipped with an anchor type agitator, horizontal water condenser and Dowtherm jacket, was used. All materials coming in contact with reactants and product were of stainless steel types 304 and 316.

The charge was as follows:

403 lbs. E-caprolactam
545 gms. p-tolyl isocyanate
44.5 lbs. distilled water

Back pressure on the kettle was 4 inches of water. Cycle:

| | |
|---|---|
| 7 hours | 60–210° C. |
| 1 hour | 210° C. (reflux). |
| 5½ hours | 210–255° C. |
| 12 hours | 255° C. |
| 8 hours | Extrusion. |

| Hours Extruded | Relative Formic Acid Viscosity [1] | Extractable in Boiling Water | Color No. (in Percent Transmissivity) |
|---|---|---|---|
| 1 | 42.1 | 14.44 | 89.6 |
| 2 | 39.5 | | |
| 3 | 40.1 | | |
| 4 | 42.6 | | |
| 5 | 41.9 | 11.77 | 86.0 |
| 6 | 43.0 | | |
| 7 | 43.1 | | |
| 8 | 42.6 | | |
| 9 | 43.0 | 11.10 | 86.5 |

[1] ASTM Method No. D-789-53T.

Further results are tabulated in the table below under "B."

Final analysis after washing and drying:

| | |
|---|---|
| Solution viscosity formic acid relative [1] | 55.7 |
| Extractable in boiling water percent | 1.94 |
| Color number, percent transmissivity in solution in 90% formic acid | 89.8 |
| Percent water | 0.02 |

EXAMPLE III

A run like that of Example II was made in which 0.3% titanium dioxide was added (as a 30% dispersion in caprolactam) to the reaction mass, when the cycle was 0 hours on temperature.

| Hours Extruded | Relative Formic Acid Viscosity [1] | Extractable in Boiling Water |
|---|---|---|
| 1 | 35.7 | 12.71 |
| 2 | 34.8 | |
| 3 | 35.9 | |
| 4 | 37.9 | |
| 5 | 40.6 | 11.23 |
| 6 | 39.3 | |
| 7 | 37.5 | |
| 8 | 37.8 | 10.99 |

[1] ASTM Method No. D-789-53T.

Final analysis after washing and drying:

| | |
|---|---|
| Solution viscosity formic acid relative [1] | 50.8 |
| Extractable in boiling water percent | 1.94 |
| Percent water | 0.09 |

Further results are tabulated in the table below under "C."

The results obtained are set forth in the following table in parts A, B and C for Examples I, II and III, respectively. In the table stability to heat and weathering is shown in units of percent loss UTS (tensile strength at break) as compared to percent loss UTS in polyhexamethylene adipamide yarns of the same denier and filament count, employed as control standards. By way of showing the specific character of the para-isomer for our purposes, results using ortho- and meta-tolyl isocyanates are given in the table.

*Table*

PERCENT LOSS UTS

| | | Thermal—165° C.—4 Hrs. | | Weatherometer— 92 Hours | | Outdoor Weathering Days | | | |
|---|---|---|---|---|---|---|---|---|---|
| | | Stabilized Samples | Controls | Stabilized Samples | Controls | Stabilized Samples | | Controls | |
| | | | | | | 60 | 90 | 60 | 90 |
| (A) | 0.5% PTI [1] | 0.0 | 40 | 10 | 24 | 32 | 37 | 55 | 62 |
| | 0.5% OTI [2] | 21 | 36 | 31 | | | 67 | | 71 |
| | 0.5% MTI [3] | 32 | 36 | 38 | | 32 | 68 | 45 | 71 |
| 0.3% TiO₂ | 0.5% PTI | 2 | 48 | 40 | 58 | 46 | 66 | 77 | 89 |
| | 0.5% OTI | 16 | 39 | 57 | | 55 | 88 | 77 | 89 |
| | 0.5% MTI | 19 | 40 | 41 | 53 | 63 | 79 | 77 | 89 |
| | | 24 Hours | | | | | | | |
| (B) | 0.3% PTI | 33 | 68 | 0.0 | 15 | 25 | 28 | 57 | 60 |
| (C) | 0.3% PTI and 0.3% TiO₂ | Not Tested | | 2.0 | 50 | 13 | 35 | 39 | 68 |

[1] PTI=Para-tolyl-isocyanate.
[2] OTI=Ortho-tolyl-isocyanate.
[3] MTI=Meta-tolyl-isocyanate.

Our process is generally applicable in caprolactam polymerization systems; for example it has been used successfully in a caprolactam polymerization catalyzed by 1% boric acid and 0.3% hexamethylene diamine. Moreover, the addition of the para-tolyl-isocyanate can be made at any time during the polymerization period; but in view of the volatility of para-tolyl-isocyanate its addition at relatively low temperatures is preferred, e.g. in the initial charge or before the reaction temperature reaches about 200° C. Polymer obtained by our process using p-tolylisocyanate proved to have greater affinity for acid dyestuffs than do polymers similarly prepared using the o- or m-isomer of the tolylisocyanate. Thus in a standard test the dye absorption by the polymer made using p-isomer was 14% greater than by that made using m-isomer and 11% greater than by that made using o-isomer.

We claim:

In a process for polymerizing epsilon-caprolactam in water which comprises forming a polymerization reaction mixture by heating a mixture of epsilon-caprolactam, water and a promoter to a temperature in the range between about 230° C. and about 300° C., the improvement which comprises adding para-tolyl-isocyanate as promoter to an initial polymerization reaction mixture which consists essentially of epsilon-caprolactam and water, at lastest at the time that the temperature of the polymerization reaction mixture reaches about 200° C., in amounts of 0.1–1 part by weight per 100 parts by weight of polymerization reaction mixture.

References Cited in the file of this patent

UNITED STATES PATENTS 2,241,321    Schlack ---------------- May 6, 1941

FOREIGN PATENTS 218,129    Australia -------------- Nov. 3, 1958